Jan. 20, 1959
W. E. WHITTINGTON
2,869,498
SOLDERING JIG FOR MECHANICAL FILTERS
Filed Nov. 4, 1957
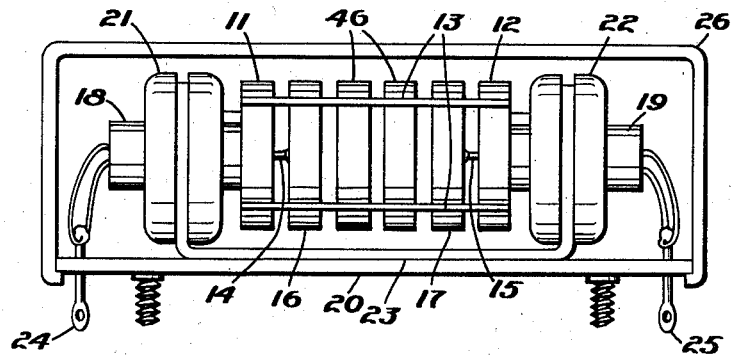
Fig. 1
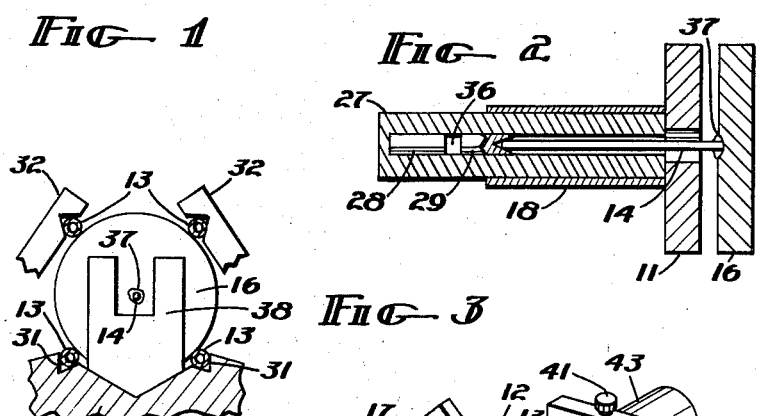
Fig. 2
Fig. 3
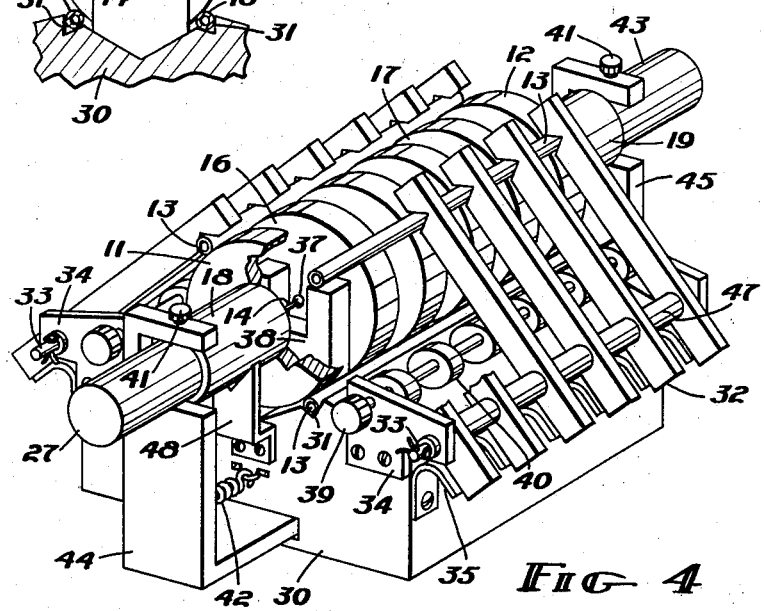
Fig. 4
INVENTOR.
WILLIAM E. WHITTINGTON
BY
ATTORNEYS

United States Patent Office 2,869,498
Patented Jan. 20, 1959

2,869,498

SOLDERING JIG FOR MECHANICAL FILTERS

William E. Whittington, North Hollywood, Calif., assignor to Collins Radio Company, Cedar Rapids, Iowa, a corporation of Iowa Application November 4, 1957, Serial No. 694,323

1 Claim. (Cl. 113—99)

This invention pertains to electromechanical filters and particularly to a new method of assembling them. A former method of assembling electromechanical filters is described in U. S. Patent No. 2,693,579 entitled "Longitudinal Support of Mechanical Filter" issued to M. L. Doelz on November 2, 1954. Each of the electromechanical filters described therein has a plurality of evenly spaced, parallel discs that are coupled together by longitudinal coupling wires connected to their peripheries. A magnetostrictive driving wire or rod, which is driven by being magnetically excited from a source of input signal, is connected to a first active or resonating disc. Another magnetostrictive rod which provides output signal is connected to a last resonating disc. As taught in the patent referenced above, the end supporting discs and the intermediate or active discs are fastened to the longitudinal coupling wires by a welding process. The end or supporting discs also have welded to them supporting cylinders that are used to enclose driving coils and the end driving rods.

In the Doelz patent supra, the end wires are attached to the peripheries of the end active discs. However, in filters of another design, the end rods or wires are connected to the centers of the active or resonating discs as taught in U. S. Patent No. 2,693,580 entitled "Electromechanical Filter With Center Drive of Disc" issued to Wesley D. Peterson on November 2, 1954. In the filter described in the latter reference, the end wires have been fastened by either a staking process or a welding process.

An object of the present invention is to provide means for assembling electromechanical filters by a soldering process in order to produce uniform filters that can be manufactured at low cost. Another object is to produce a filter in which the discs are accurately spaced relative to each other. These objects, the following description and the appended claim may be more readily understood with reference to the accompanying figures in which:

Figure 1 is a side view of a mechanical filter to which the novel assembling method of this invention is applied;

Figure 2 is a sectional view of an end wire holding jig for assembling end wires to filter discs;

Figure 3 is a partial sectional view of the jig of Figure 4 to show placement of a disc and spacer within the jig; and Figure 4 is an oblique view of a partially assembled electromechanical filter inserted within a soldering jig.

In Figure 1, a plurality of evenly spaced resonant discs are mounted between end supporting discs 11 and 12 by longitudinal coupling wires 13. The end resonant discs 16 and 17 have rigidly fastened thereto end driving wires 14 and 15 that extend into the cylinders 18 and 19, respectively, from the centers of the discs. The end driving wires are positioned on the axes of the end cylinders and pass through the centers of respective driving coils that are mounted within the cylinders. The filter assembly is mounted to base 20 through resilient grommets 21 and 22 and mounting strap 23. The grommets fit snugly about the cylinders and have a groove centered about the periphery for receiving the slotted ends of strap 23. Terminal wires for the driving coils (not shown) are mounted to feed-through terminals 24 and 25 which are insulated from base 20. The mechanical filter assembly is usually enclosed in a hermetically sealed case 26.

The discs, end wires, coupling wires, and end cylinders of the filters according to a method of assembling described herein are assembled in a jig and soldered together simultaneously by applying heat uniformly to the entire assembly. Before assembling, the parts that are to be soldered together are plated with solder in order that firm solder connections can be obtained even though rosin is used as the flux in the final soldering operation. The end supporting discs 11 and 12, resonating discs 16, 17, and 46, end supporting cylinders 18 and 19, and coupling wires 13 are electroplated in a fluoroborate bath with 40% lead and 60% tin solder. A desirable thickness of the plating is .0001 inch. Before end resonating discs 16 and 17 are electroplated, they should be provided with a center dimple 37 where the driving rods are to be attached. For example, when the end wires that are to be attached have outside diameters of .012 to .014 inch, a dimple having a diameter of approximately .020 inch may be formed in the center of each disc. This depression is then filled with solder that consists of 60% tin and 40% lead. The end discs may then be surfaced to remove excess solder and afterwards tuned to the desired frequency as required. Coupling wires 13 are cut to the required lengths from music wire having, for example, a diameter of .028 inch and then electroplated with solder to a diameter of approximately .031 inch. Afterwards, the wires are drawn through a sizing dye in order to obtain plated wires of uniform diameter.

Each end wire has one end tinned by dipping it into acid flux and then into molten 60–40 solder. End wire holders are provided to facilitate extact positioning of the end wires in the filter assemblies. Suitable end wire holders are described in a co-pending application Serial No. 694,322 filed by J. L. Gertz and assigned to the assignee of this invention. The end wire holding jig 27 of Figure 2 has an axial bore 36 that has a diameter slightly larger than that of the end wires. The bare end of a wire is inserted into the bore of one of the holders so that the tinned end of the wire projects outward from the holder. After the end wire has been inserted quite far into the holder, the inner end of the wire contacts resilient means for constantly urging the wire outward. In the example shown in Figure 2, the resilient means includes magnets 28 and 29 which are positioned in one end of the bore so that like magnetic poles are adjacent in order to establish a repelling force between the magnets.

The complete jig for assembling mechanical filters is shown in Figure 4. This jig includes a V block, attached arms, end brackets, and spacers for evenly spacing parallel discs and for positioning coupling wires and end wires in the relative positions in which they are to be soldered in place. The jig may be fabricated from any material that retains its shape at oven temperatures and to which solder does not readily adhere. Because of its lightness and strength, aluminum is a preferred material. The V block 30 has a V-shaped positioning groove 31 disposed longitudinally along each one of its inside slanting surfaces for receiving a coupling wire 13. A plurality of arms 32 spaced apart by spacers 47 are rotatably mounted on each side of V block 30. Each set of arms is mounted on rod 33 that is secured to the V block by a pair of brackets 34. Individual leaf springs 35 for each one of the arms 32 is secured to the block at points opposite the respective arms. Each spring bears outward on that portion of the respective arm below the pivot in order to urge the upper portion of the arm inward. The upper portion of each arm has a V-shaped notch in its inner edge for positioning coupling wires that are to be soldered. Cams 40 are rotatably mounted to the V block for operating against the inside edges of arms 32. Knob 39 is secured to the end of the cam shaft for operating the cams. Two brackets are attached to each end of V block 30 in order to position end cylinders and end wire holders. On one end, for example, fixed bracket 48 which extends upward has a V-shaped notch in the upper end for receiving an end cylinder. Bracket 44 is positioned in a slot in the end of the block and has a helical spring 42 extending between the bracket and the block for urging the bracket inward during the soldering operation. A rectangular clamp at the top of the bracket includes a screw 41 for securely clamping the end wire holder 27 in place during assembly of the filter.

The spacers 38, which are to be placed between adjacent discs, are made either from aluminum or from a plastic material. Aluminum spacers, which are preferred, may be left in place during the time that the jig is in an oven. When plastic spacers are used, they are carefully removed after the mechanical filter is assembled in the jig but before it is placed in an oven. Preferably, the spacers are inserted or withdrawn through a longitudinal rectangular slot that is centrally located in the bottom of V block 30. The spacers 38 that are to be placed adjacent end supporting discs 11 and 12 are slotted to permit passage of end wires 14 and 15 through end supporting discs 11 and 12 to respective resonant discs 16 and 17.

Before the mechanical-filter discs are inserted in the V block, knob 39 is rotated to operate cams 40 for rotating the arms outward so that the V block is accessible for placement of filter parts. Two plated coupling wires 13 to which rosin flux has been applied are placed individually in grooves 31. The resonant discs and spacers 38 are placed alternately between end discs 11 and 12 within the V block. The peripheries of each of the discs then bear against each of the wires 13 that have been placed in the jig. The grooves 31 have been so positioned in the V block that the coupling wires contact the inserted disc at points that are separated by a 90-degree arc. Two additional coupling wires 13 are placed in contact with the discs and held in place by arms 32 that are rotated inward to bear against the wires. The V-shaped notches at the upper ends of the arms are properly aligned for receiving the two upper wires and maintaining them at points on the discs that are 90 degrees from the lower wires that have been placed in the V block.

After the coupling wires are in place, cylinder 18 is positioned on bracket 48 which is shaped for holding the cylinder coaxially against the outer face of the end disc 11. Flux is applied to the tinned portions of the end wires, and then end wire holder 27, which contains end wire 14, is inserted into cylinder 18 so that the tinned end of the end wire passes through a central hole in supporting disc 11 and engages solder-filled depression 37 of the first active disc 16. The end wire holder 27 is supported by bracket 44 which is slidably mounted to the end of V block 30 and is urged inward toward the end of the V block by spring 42 that is fastened between the bracket and the V block. The spring-loaded bracket presses against the outer edge of cylinder 18 so as to urge the inner edge against end plate 11. When the end wire holder 27 is properly positioned and the magnet 29 effectively presses on end wire 14, set screw 41 is tightened so that the end wire holder is held securely by the bracket 44. On the opposite end of the filter, cylinder 19 and end wire holder 43 are held in a similar manner by spring-loaded bracket 45. The two spring-loaded brackets 44 and 45 that bear inward against the cylinders 18 and 19 in co-opertion with spacers 38 maintain the discs at desired predetermined spacing. The assembled parts of the electromechanical filter and the jig are then placed in a 400-degree oven for two minutes in order that the solder-plated surfaces that are in contact will be soldered together. While the solder is melted, surface tension will cause the solder to flow toward points where the surfaces of the various parts of the electromechanical filter are in contact.

When the assembled filter has cooled, it is removed from the jig and cleaned to remove remaining flux. The filter is checked for resonant frequency response, and the end wires are tuned in the usual manner. The driving coils are inserted, and the filter is mounted in its base to complete the assembly.

Although this invention has been described with respect to a particular embodiment thereof, it is not to be so limited as changes and modifications may be made therein which are within the full intended scope of the invention as defined by the appended claim.

What is claimed is:

A jig for assembling electromechanical filters of the type that have a plurality of parallel spaced discs of uniform diameter coupled together at their peripheries by coupling wires and that have end wires connected to end active discs, said jig comprising a V block having a pair of plane intersecting surfaces, a V-shaped notch in each of said surfaces parallel to the intersection thereof, said notches for accurately positioning ones of said coupling wires so that arcuate sections thereof protrude above said surfaces, said wires when placed in said notches being spaced apart such that they can support said parallel spaced discs by contacting the peripheries thereof, a plurality of spaced parallel arms rotatably mounted on each side of said V block, each of said arms having a notch for positioning ones of said coupling wires traverse the peripheries of said discs, means for constantly urging said arms inward, a plurality of end wire holders, each of said holders having a bore for slidably receiving one of said end wires, a bracket secured to each end of said V block for securing said end wire holder so that the bore thereof is aligned with the axes of said discs, and means for constantly urging outward wires that have been inserted within said holder.

References Cited in the file of this patent

UNITED STATES PATENTS

| 1,060,477 | Meyers | Apr. 29, 1913 |
| 2,219,742 | Haversack | Oct. 29, 1940 |
| 2,235,553 | Haversack | Mar. 18, 1941 |